United States Patent [19]

Kim et al.

[11] Patent Number: 4,654,319

[45] Date of Patent: * Mar. 31, 1987

[54] DOUBLY PROMOTED PLATINUM GROUP METAL CATALYSTS FOR EMISSION CONTROL AND METHOD FOR MAKING THE CATALYSTS

[75] Inventors: Gwan Kim, Olney; Michael V. Ernest, Catonsville, both of Md.

[73] Assignee: W. R. Grace & Co., New York, N.Y.

[*] Notice: The portion of the term of this patent subsequent to Oct. 9, 2001 has been disclaimed.

[21] Appl. No.: 816,542

[22] Filed: Jan. 6, 1986

Related U.S. Application Data

[63] Continuation-in-part of Ser. No. 745,756, Jun. 17, 1985, abandoned, which is a continuation of Ser. No. 629,309, Jul. 10, 1984, Pat. No. 4,591,580, which is a continuation-in-part of Ser. No. 461,119, Jan. 26, 1983, Pat. No. 4,476,246.

[51] Int. Cl.$^4$ .......................... B01J 21/04; B01J 23/10; B01J 23/58
[52] U.S. Cl. .................................. 502/304; 423/213.5
[58] Field of Search ............................... 502/303, 304; 423/213.5

[56] References Cited

U.S. PATENT DOCUMENTS 4,128,503 12/1978 Yamauchi et al. ............... 423/213.5
4,369,132 1/1983 Kinoshita et al. ............ 252/466 PT

FOREIGN PATENT DOCUMENTS 53-19986 2/1978 Japan ................................... 502/303

Primary Examiner—W. J. Shine
Attorney, Agent, or Firm—Edward J. Cabic

[57] ABSTRACT

Alumina supported platinum-group metal pelleted catalysts are made which exhibit excellent performance and which have unique Pt concentration profiles. The catalysts are doubly promoted with ceria and alkali metal oxides, especially ceria along with lithia, and can optionally have nickel (oxide) as a base metal catalytic ingredient. The unique Pt profile is obtained by adding at least part of the Rh component separately from any other Pt group metals.

17 Claims, 2 Drawing Figures

DOUBLY PROMOTED PLATINUM GROUP METAL CATALYSTS FOR EMISSION CONTROL AND METHOD FOR MAKING THE CATALYSTS

CROSS-REFERENCE TO RELATED APPLICATIONS

This application is a continuation-in-part of U.S. application Ser. No. 745,756 filed June 17, 1985, now abandoned which is a continuation of U.S. application Ser. No. 629,309 filed July 10, 1984, now U.S. Pat. No. 4,591,580, which in turn is a continuation-in-part of U.S. application Ser. No. 461,119, filed Jan. 26, 1983, now U.S. Pat. No. 4,476,246.

BACKGROUND OF THE INVENTION

1. Field of the Invention

This invention relates to a catalyst for use in auto emission control which has improved poison resistance for long term durability and especially for an improved three-way catalyst (TWC)

2. Description of Previously Published Art

As we described in our U.S. Pat. No. 4,476,246, performance of alumina-supported platinum group metal catalysts, especially Pt-Rh or Pt-Pd-Rh TWC, could be substantially improved by doubly promoting the catalyst with ceria and the oxides of alkali metals, especially of Li. There still exists the need to produce a catalyst with an even longer term durability which requires improved poison resistance.

OBJECTS OF THE INVENTION

It is an object of this invention to obtain a long-durability doubly-promoted catalyst and especially a TWC.

It is a further object of this invention to provide an improved method for incorporating catalytic ingredients especially noble metals so as to resist deactivation due to poisoning.

It is a further object to obtain a durable catalyst and especially a TWC without sacrificing catalytic performance as reflected in conversion efficiencies after aging by utilizing noble metal impregnation procedures which will ensure high catalytic performance.

It is a further object to obtain a long-durability pelleted catalyst and especially a TWC by optimizing the noble metals concentrations, to a lower level than found in the conventional pelleted TWCs at or near the exterior surface of the pellet while limiting the overall metals penetration to a desired depth.

It is a further object to improve the hydrocarbon efficiency of the catalyst by adding nickel to the catalyst.

These and further objects will become apparent as the description of the invention proceeds.

SUMMARY OF THE INVENTION

It is a feature of this invention to deposit the catalytic metals such as Pt-Rh or Pt-Pd-Rh, with unique metal concentration profiles, especially for the Pt component of the metals, which make the pelleted catalysts of this invention exhibit excellent performance and much longer than the usual 50,000-mile durability. The catalytic metals with their unique metals concentration profile can be applied to any support including those which have been lanthana stabilized. This unique metals concentration profile has at least three distinguishing characteristics. First, unlike the "layered" catalyst described in U.S. Pat. Nos. 4,128,506 (Hegedus et al) and 4,152,301 (Summers et al), the Pt component metal does not exhibit a substantially higher concentration at or near the exterior surface of the pellets than in the interior. Second, the concentration of the Pt at or near the exterior surface represents a substantially lower fraction of the Pt loaded than those disclosed in U.S. Pat. Nos. 4,128,506 (Hegedus et al), 4,152,301 (Summers et al), and U.S. Pat. No. 4,405,506 (Kim). Because the metals located at or near the exterior surface of the catalyst are more susceptible to poisoning, this reduces the amounts of both the major and minor component metals that will be wasted. Third, the overall penetration depth of each metal is controlled so as not to exceed approximately 300 microns (based on the $SnCl_2$ solution staining method). Catalysts with such metals concentration profiles can be prepared by following the special impregnation and drying procedures described below as well as in Examples 3, 4, and 6.

The metals concentration profile determined by the layer abrasion test described in U.S. Pat. No. 4,152,301 has a platinum concentration curve as a function of depth which is concave down, i.e., having a second derivative of the mathematical expression with respect to depth curve not greater than zero, from the surface down to a point of inflection for the curve.

For rhodium, the maximum concentration is within about 50 microns of the exterior surface of the support and no more than about 95% of the total rhodium loaded is located within about 100 microns depth.

In another embodiment, Ni may be added from 0.5 to 20 wt. % NiO and preferably from 1 to 10 wt. % NiO to improve the catalyst efficiency for hydrocarbon conversion and especially as a TWC.

DETAILED DESCRIPTION OF THE INVENTION

Catalysts with long term durability can be made which may not require the same degree of hydrothermal stability provided by the lanthana stabilization technique described in U.S. application Ser. No. 629,309, filed July 10, 1984. In this method according to the present invention the catalyst, which is suitable for use as a three-way catalyst for auto emission, is preferably made by applying promoters and at least two platinum group metals by one of two procedures. In the first procedure an alumina support which has been heated to at least 300° C. is impregnated with a soluble cerium salt solution. The impregnated support is heated to at least decompose the cerium salt to obtain a ceria impregnated support. Then the ceria impregnated support is impregnated with solutions bearing one or more platinum group metals and at least one alkali metal, and further including a Rh containing solution which has at least part of the Rh solution impregnated separately from the other platinum group metal solutions and alkali metal-bearing solutions.

In the second procedure the alumina support which has been heated to at least 300° C. is impregnated with a solution containing a cerium salt and a lithium salt. The impregnated support is heated to at least decompose the cerium and lithium salts to obtain a ceria-lithia impregnated support. Then the ceria-lithia impregnated support is impregnated with solutions bearing one or more platinum group metals including Rh and where at least part of the Rh containing solution is impregnated separately from the other platinum group metal solutions to form a catalyst.

When the catalyst is being formed by either of these two methods, it is air dried at an ambient temperature up to six hours, preferably 0–4 hours and more preferably for ½–4 hours and then drying at about 100°–150° C. so as to dry the catalyst after each impregnation with the solutions bearing catalytic metals. During one of the heating steps the catalyst is heated to a temperature of at least 800°–1100° C. to provide thermal stabilization of the support. Finally, after all the noble metals are added it is activated at a temperature of about 250°–550° C. with the preferred activation being done in the presence of hydrogen. It is also possible that the alkali metal ingredient can be incorporated along with noble metals other than Rh. Furthermore, optionally, Ni can also be incorporated along with noble metals other than Rh.

Figure 1A:
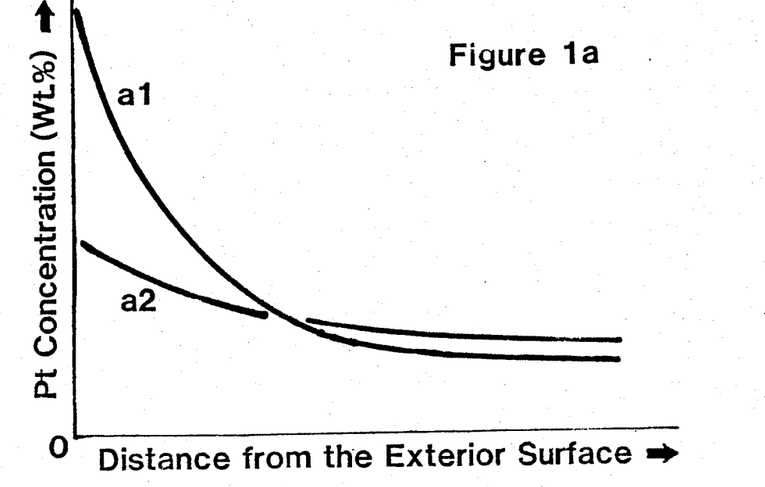
FIG. 1a is a graph of the platinum concentration vs. depth curves for catalysts made using chloroplatinic acid as the platinum source and conventional impregnation procedures.
Figure 1B:
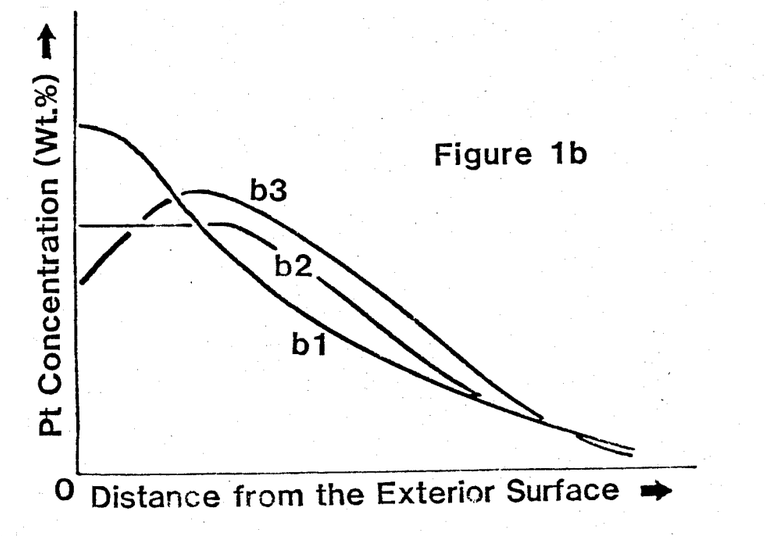
FIG. 1b is a graph of the platinum concentration vs. depth curves for catalysts made according to the present invention.

The Pt distribution in pelleted catalysts according to this invention can be readily distinguished by their concentration profiles, FIG. 1b, from those found in the conventional catalysts of the prior art, FIG. 1a. See FIG. 1a which illustrates two types of Pt concentration vs. depth curves. The curve $a_1$ is the type of the Toyota Pat. No. 4,369,132 where there is a relatively high Pt concentration at the exterior surface which sharply falls off initially with increasing depth, but exhibiting a fairly deep penetration depth. This curve is concave up, exhibiting no inflection point, i.e., the second derivative of the Pt concentration with respect to depth being positive. A similar concave-up curve is seen in curve $a_2$ which is representative of the Pt distribution in the Kondo et al Japanese Pat. No. 53-19,986. Again there is a maximum Pt concentration at the exterior which does not fall sharply off with increasing depth but exhibits a very deep penetration depth. An additional interpretation may be inserted here regarding the rather low Pt concentrations in the 0–300 micron region, which is important for long-term durability. Too deep penetration of Pt obviously results in wasted metal.

The Pt concentration profiles for the catalysts according to the present invention, FIG. 1b, are typified by a Pt concentration curve as a function of depth which is concave down from the surface down to the point of inflection of the curve. Of the three concave-down curves, $b_1$, $b_2$, and $b_3$, it is especially preferable for Pt to have curve $b_3$ where there is initially a relatively low surface concentration of Pt. Then the Pt concentration increases to a subsurface maximum which then trails off to lower concentrations at the interior as the depth approaches approximately 300 microns.

Although the other two concave-down curves $b_1$ and $b_2$ are somewhat different from curve $b_3$, both are much more like curve $b_3$ than the concave-up curves, $a_1$ and $a_2$, in that both $b_1$ and $b_2$ have most of Pt within the important outer shell of approximately 300 micron thickness while maintaining moderately high Pt concentrations throughout this 0–300 micron region which contributes significantly to long-term catalyst performance.

Thus, a maximum degree of noble metal utilization could be achieved by the catalysts of this invention as a result of minimization of metals waste within practically attainable limits by moderating the concentration at or near the exterior surface of Pt, which in many cases is the major component of the metals, and by limiting the metals penetration to a depth beyond approximately 300 microns.

The platinum group metal component may be platinum, palladium, rhodium, ruthenium, iridium, osmium, and mixtures thereof, with the preferred metals being Pt, Pd, Rh either alone or in any combination. When the platinum group metal contains more than one of such components, the component may be composed of a major amount of platinum or palladium and a minor amount of one or more of the other platinum group metals such as rhodium. When platinum and palladium are used in combination, they can be in any ratio. The catalytic metals mixture may comprise from 0 to about 20 wt. % rhodium, or mixtures thereof and preferably about 10 wt. % rhodium and about 90 wt. % platinum, palladium, or mixtures thereof.

Various compounds, complexes, or fine metal dispersions of any of the platinum group metals in an aqueous or an organic medium may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, ammonium platinum thiosulfate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains sulfito complexes of platinum group metals. For platinum and palladium, either an acid or an ammonium sulfito complex can be used. The most preferred platinum source is the ammonium sulfito complex prepared according to the methods described in U.S. Pat. No. 3,932,309 (Graham et al). The use of these complexes provides excellent dispersion and control of penetration depth of the platinum group metal. Preferably, rhodium is incorporated in the catalyst by impregnation with an acid rhodium sulfito complex prepared by reacting rhodium trichloride or rhodium hydrous oxide with sulfurous acid.

In a preferred embodiment of this invention the pellets are held preferably for up to two hours at room temperature after each impregnation is completed with the metal or metals. The composition may then be dried, for example, at a temperature of from about 100° C. to about 150° C. for about 2 to about 20 hours. The salt composition may be decomposed and the catalyst activated under conditions which provide a composition having characteristics that promote the desired reaction. The temperature of this activation is low enough to permit neither noble metal sintering nor sintering of the support. It is preferably done in a reducing atmosphere, e.g., by about a 1 hour reduction in flowing nitrogen containing 5 volume percent hydrogen at about 250°–550° C. and more preferably at about 400° C.

In the catalyst of this invention, the platinum group metals provide the catalytically active surfaces for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

The preferred methods for providing platinum group metals have been discussed above. When making a catalyst which contains Rh, it is especially preferred to impregnate at least part of the Rh-containing solution separately from the other platinum group metal solutions and to add a penetration aid to the Rh containing solution. Nickel can be further added in an amount of 0.5 to 20 wt. % NiO and especially in an amount of 1–10% NiO.

When the solutions of cerium salt and lithium salt are applied in the second procedure they can be added either (a) by first a cerium salt followed by a lithium salt, (b) by first a lithium salt followed by cerium salt or (c) by a simultaneous application of a mixture of the cerium salt and the lithium salt.

When making alumina particle catalysts the amount of $CeO_2$ promoter applied is preferably between 1 and 20 wt. % and more preferably between 2–10 wt. %. The amount of alkali metal promoter applied expressed as the weight percent of the oxide $M_2O$, may be any effective amount up to about 5 wt. % and more preferably from about 0.5 to 4 wt. %.

The $SnCl_2$ solution staining method is used to visually determine the gross penetration depth of the metals. This method involves treating the catalyst in a boiling solution of $SnCl_2$ which turns the catalytic material dark for good visualization. The penetration of the catalytically active materials is determined by microscopic examination of a cross-section of the catalyst against a micron scale. By following the procedure according to the present invention the noble metals penetrate the support to a distance of less than 300 microns as measured by this method. Because of the detection limit of the human eye, it is difficult by this method to determine Pt concentrations below about 0.15 wt % Pt. Thus although the catalysts described as having no noble metals below a distance of 300 microns as measured by this $SnCl_2$ solution staining method, there still is some Pt present at a concentration of less than about 0.15 wt % Pt.

Having described the basic aspects of the invention, the following examples are given to illustrate specific embodiments thereof.

EXAMPLE 1

This example describes the preparation of a ceria-lithia promoted alumina support and the preparation of solutions to apply the catalytic materials.

Alumina beads produced according to the procedure in U.S. Patent 4,179,408 by M. G. Sanchez and N. R. Laine, hereafter referred to as simply alumina beads, were precalcined for 16 hours in approximately 400° C. air. A 25 kg batch of this alumina bead having 3 wt. % total volatiles were impregnated by spraying with approximately 24.5 liters of mixed nitrate solution containing 766 g of $CeO_2$ in the form of cerous nitrate and 511 g of $Li_2O$ as lithium nitrate. After oven drying the beads at 135° C. for 16 hours, a portion of the beads were air calcined at 1038° C. for one hour. The resulting beads were sifted through 5- and 10-mesh sieves. The beads in the $-5+10$ mesh range had an average diameter of 2.8 mm., 0.477 g/cc bulk density, and 0.900 cc/g water pore volume. This doubly-promoted support was formulated to contain 3 wt % $CeO_2$, 2 wt. % $Li_2O$, and balance $Al_2O_3$. In order to convert a portion of this support to a Pt-Rh catalyst, sulfito complex solutions of noble metals were prepared according to the procedure described below.

Approximately 150 g of a diulute solution containing 4.40 g of 41.62% ammonium bisulfite was adjusted to a pH of 8.33 using a dilute $NH_4OH$ solution. To this was slowly added 4.9324 g of a chloroplatinic acid solution containing a total of 0.750 g Pt. The solution was then diluted with deionized water to exactly 250 g. The solution turned colorless within one hour upon standing at ambient temperature. This solution bearing 3 g of Pt per kg of solution is hereafter referred to as Solution A.

Approximately 60 g of a dilute sulfurous acid solution in a bottle containing 0.374 g of pure $SO_2$ was contacted with 2.364 g of $RhCl_3$ solution containing 200 mg of Rh. After gentle mixing and dilution with deionized water to a 100 g solution, the bottle was sealed, and then soaked in a 60° C. water bath for 2 hours. The solution was cooled to room temperature before use. This solution containing 2 mg of Rh per g of solution is hereafter referred to as Solution B.

EXAMPLE 2

This example serves as a control to show depositing rhodium and platinum together.

Alumina beads were air calcined for one hour at 1038° C. A portion of beads in the 5–10 mesh range were impregnated to incipient wetness with a cerous nitrate solution. After drying overnight at 135° C., the beads were calcined for one hour in 732° C. air. The resulting beads containing 3 wt. % $CeO_2$ were sifted through 5- and 10-mesh sieves. Beads in the 5–10 mesh range had a bulk density of 0.453 g/ml and a water pore volume of 0.973 cc/g. This support is hereafter referred to as Support A.

A 300 ml portion of Support A was impregnated by spraying with 120 ml of solution containing 173 mg of Pt in the form of $(NH_4)_6Pt(SO_3)_4$ salt solution. After drying overnight at 135° C., the beads were resprayed with 112 ml of solution containing 48.9 mg of Pt in the form of $(NH_4)_6Pt(SO_3)_4$ salt solution, 18.5 mg of Rh in the form of Solution B, and 0.3 millimole of dibasic ammonium citrate. The impregnating solution had a pH of 2.30. After drying again overnight at 135° C., the catalyst was activated for a one hour reduction period in flowing $N_2$ containing 5% $H_2$ at 400° C. The resulting catalyst was formulated to have the following metals loading (g metals/liter catalyst): 0.740 g Pt and 0.0617 g Rh.

EXAMPLE 3

A 300 ml batch of Support A from Example 2 was impregnated by spraying with 120 ml of solution containing 18.5 mg of Rh in the form of Solution B and 0.75 millimole of dibasic ammonium citrate. After drying overnight at 135° C., the beads were resprayed with 112 ml of solution containing 221.9 mg of Pt in the form of (NH$_4$)$_6$Pt(SO$_3$)$_4$ salt solution. The impregnating solution had a pH of 4.44. The beads were dried again at 135° C. overnight. Finally, the catalyst was activated by a one hour reduction in the same manner as in Example 2. The resulting catalyst was formulated to have a metals loading identical to that of the catalyst in Example 2.

EXAMPLE 4

A 300 ml batch of Support A from Example 2 was impregnated by spraying with 120 ml of solution containing 221.9 mg of Pt in the form of (NH$_4$)$_6$Pt(SO$_3$)$_4$ salt solution. After drying overnight at 135° C., the beads were resprayed with 112 ml of solution containing 18.5 mg of Rh in the form of Solution B in Example 1 and 0.75 millimole of dibasic ammonium citrate. The impregnating solution had a pH of 2.50. After drying again overnight at 135° C., the catalyst was activated by one hour reduction in the same manner as in Example 2. The metals loading for this catalyst is identical to that of the catalyst in Example 2.

EXAMPLE 5

An 8.5 ml each of the three catalysts prepared in Examples 2, 3, and 4 was subjected to accelerated pulsator aging for a period of 90 hours at approximately 60 pulses/minute, using n-hexane containing 0.132 g/liter Pb, 0.040 g/liter P, and 0.08 wt. % S. During the period of aging the catalyst samples were allowed to experience cycling temperatures. The cycle consisted of 75 minutes at 566° C. (at wall) and 15 minutes at 732° C. (at wall). Each catalyst sample was then evaluated by the "Perturbed Sweep Test" procedure described in Ind. Eng. Chem. Prod. Res. Dev., 21, 267 (1982), using the simulated exhaust gas feed shown in Table 1.

TABLE 1

| Simulated Auto Exhaust Gas Mixture for the Perturbed Sweep Test | |
|---|---|
| Gas | Vol % |
| HC[a] | 0.0400 |
| CO | 0.030–0.78 |
| H$_2$ | 0.10–0.26 |
| NO | 0.185 |
| SO$_2$ | 0.0020 |
| O$_2$ | 0.245–0.725 |
| CO$_2$ | 14.5 |
| H$_2$O | 10.0 |
| N$_2$ | Balance |

[a] A mixture of C$_3$H$_6$ and C$_3$H$_8$ at a molar ratio of C$_3$H$_6$/C$_3$H$_8$ = 4/1.
The results are presented in Table 2.

TABLE 2

| | | Performance[a] of 90-hr. Pulsator-Aged TWCs | | | | | | | | |
|---|---|---|---|---|---|---|---|---|---|---|
| Catalyst in Example | Rhodium Applied Alone | Rich (R = 0.7) | | | Stoi. (R = 1.0) | | | Lean (R = 1.5) | | |
| | | HC | CO | NO | HC | CO | NO | HC | CO | NO |
| 2 | No | 72 | 38 | 63 | 74 | 42 | 52 | 75 | 52 | 33 |
| 3 | Yes | 76 | 44 | 66 | 77 | 52 | 57 | 75 | 63 | 38 |
| 4 | Yes | 76 | 46 | 67 | 77 | 54 | 57 | 77 | 66 | 39 |

[a] At approximately 60,000 GHSV by the "perturbed sweep test".

When following the preferred noble metal impregnation procedure in which Rh is impregnated in the form of an acid sulfito complex solution along with a penetration aid such as dibasic ammonium citrate, independent of other noble metals as illustrated in Examples 3 and 4, the resulting catalyst is shown to be clearly superior to the procedure often employed in catalyst preparation illustrated in Example 2 where the entire Rh is added along with another noble metal.

EXAMPLE 6

This example illustrates the production of a larger batch of the type shown in Example 3 which has been tested for dynamometer aging.

A ceria-lithia promoted support was prepared using the same procedure as described in Example 1. That resulting support had a total volatile content of 3.35%, a bulk density of 0.4777 g/cc, and a water pore volume of 0.95 cc/g. The CeO$_2$ and Li$_2$O contents were determined by chemical analysis to be 3.27% and 2.32%, respectively.

A TWC was prepared by impregnating to a platinum loading of 0.712 g per liter of catalyst and a rhodium loading of 0.0712 g per liter of catalyst. This was accomplished by starting with 28162 grams of the above ceria-lithia promoted support which was impregnated by spraying with a solution of rhodium sulfito complex through atomizing nozzles. The rhodium sulfito complex solution was prepared by reacting at 60° C. for 2 hours 89.775 grams of rhodium trichloride solution (having a rhodium concentration of 4.8615%) with 115.84 grams of sulfurous acid (having a SO$_2$ content of 7.39%) diluted with deionized water to a total volume of 4364 milliliters. After the two-hour reaction time, the reaction mixture was cooled to room temperature and then diluted to 23.2 liters at which volume the pH was 2.0. Then 33.25 grams of dibasic ammonium citrate was added, followed by dilution to 24.08 liters at which volume the pH was 2.9. After the rhodium solution was applied the impregnated support was allowed to remain in the impregnation vessel for two hours at room temperature. It was then transferred to a forced draft oven for 16 hours at 135° C.

The above material once removed from the oven and cooled to room temperature was reimpregnated with a platinum-containing solution by spraying through atomizing nozzles. The platinum-containing solution was prepared by diluting 474.17 grams of hexammonium platinum tetrasulfite solution (having a platinum concentration of 9.2045%) to a final volume of 22.74 liters at which volume the pH was 5.9. This was again allowed to remain in the impregnation vessel for two hours at room temperature once impregnation had been completed. After drying for 16 hours at 135° C., the catalyst was activated in a flow of 5% hydrogen/95% nitrogen for one hour at 385°–399° C.

The resulting catalyst had a bulk density of 0.4812 g/cc, a BET surface area of 117 m$^2$/g, and major/minor axes dimensions of 3.07/2.57 millimeters, respectively.

This catalyst has performed superbly after the dynamometer equivalent of 50,000-mile aging, setting the best performance record ever established for a 160-cubic inch single-bed pelleted TWC converter, better than 90% for both HC and CO and better than 45%

$NO_x$ conversion efficiencies. This performance represents a substantial improvement over those having similar compositions which were prepared in the same manner as in Example 2.

The uniqueness of the catalyst of this example as well as those prepared by using this new metals impregnation and drying procedure is in the metals concentration profiles which can be characterized as follows. First, the platinum concentration curve as a function of depth is concave down from the surface down to the point of inflection for the curve, if it exists. This "concave down" means that the second derivative of the mathematical expression describing the concave-down segment of the curve is not greater than zero. The practical result of this Pt concentration curve is that not all of the Pt is at the surface. Instead there is a substantial proportion of the Pt in the subsurface region such that it will still be catalytically active after the catalyst has been subjected to poisons in the exhaust gas. Second, in the preferred embodiments a maximum rhodium concentration is also found within about 50 microns of the exterior surface of the support and no more than about 80% of the total rhodium loaded is located within about 100 microns depth. Finally the average metal penetration depth as determined by the $SnCl_2$ staining method does not exceed approximately 300 microns.

It should be noted that the distribution of catalytic metals in this new type of long-durability pelleted TWCs has been optimized to lower the metals concentrations at or near the exterior surface of the pellet while limiting the metals penetration to a desired depth. Lower metals concentration at or near the exterior surface means lower waste due to poisoning than otherwise. Confining the metals distribution to within the outer shell of desired thickness also reduces waste of metals because the metals located too deep contribute little because of pore diffusion limitation.

The following Examples 7 and 8 are control catalysts for the nickel containing catalyst of Example 9. The comparison test results are given in Example 10.

EXAMPLE 7

This example will serve as a control to show the improvement in HC conversion when nickel is added.

Alumina beads were air calcined at 1038° C. for one hour. Based on 3 wt. % and 6 wt. % $CeO_2$ formulation, two separate batches of the above calcined alumina beads were impregnated to incipient wetness with cerous nitrate solutions, dried at 135° C. overnight, and air calcined at 760° C. for one hour. The resulting batches of beads, one with 3 wt. % $CeO_2$, the other with 6 wt. % $CeO_2$, were sifted through 5- and 10-mesh sieves. One with 3 wt. % $CeO_2$ had a bulk density of 0.447 g/cc, and a water pore volume of 0.920 cc/g. The other with 6 wt. % $CeO_2$ had a bulk density of 0.448 g/cc and a water pore volume of 0.912.

Solutions A and B of Example 1, 300 g and 100 g, respectively, were freshly prepared. A fresh Solution C was prepared by contacting approximately 70 g of dilute sulfurous acid containing 1.00 g of $SO_2$ with 4.630 g of Pd-nitrate solution bearing a total of 363 mg Pd. The solution was diluted to 121 g. The resulting acid sulfito complex solution contains 3 g of Pd per kg of solution. This is hereafter referred to as Solution C.

A 300 ml batch of alumina beads promoted with 6 wt. % $CeO_2$ prepared above was sprayed with 120 ml of solution containing 71.2 mg of Pd in the form of Solution C and 0.75 millimole of dibasic ammonium citrate. After drying at 135° C. overnight the beads were reimpregnated by spraying with 113 ml of solution containing 178 mg of Pt in the form of a freshly prepared Solution A and 10.9 mg of Rh in the form of a freshly prepared Solution B. The impregnating solution had a pH of 2.9. After drying again overnight at 135° C. the beads were activated for a one hour reduction period in the same manner as in Example 2. Metals loading (g metals/liter catalyst) of this catalyst was as follows: 0.593 g Pt, 0.237 g Pd, and 0.0356 g Rh. This catalyst also contained 6 wt. % $CeO_2$.

EXAMPLE 8

This example will serve as a control to show the improvement in HC conversion when nickel is added.

A 300 ml batch of alumina beads promoted with 6 wt. % $CeO_2$ prepared in Example 7 was sprayed with 120 ml of solution which was prepared as follows: 6.72 g of $LiNO_3$ crystals (99.8% assay) was dissolved in approximately 60 g of water. To this was added 0.75 millimole of dibasic ammonium citrate and dissolved. Then to this was added 71.2 mg of Pd in the form Solution C. The solution was finally diluted with water to 120 ml. After drying at 135° C. overnight the beads were resprayed with a Pt-Rh-containing solution, dried at 135° C., and activated in exactly the same manner as in Example 7. The catalyst also contains 5.94 st% $CeO_2$ and 1 wt. % $Li_2O$.

EXAMPLE 9

This example has an additional nickel component added for increased HC conversion.

A 300 ml batch of alumina beads promoted with 3 wt. % $CeO_2$ prepared in Example 7 was sprayed with 119 ml of solution which was prepared as follows: 8.42 g of $Ni(NO_3)_2 6H_2O$ crystals and 10.04 g of LiNO crystals were dissolved in a minimal amount of water, and then diluted to approximately 70 g. To this was added 0.75 millimole of dibasic ammonium citrate and 71.2 mg of Pd in the form of Solution C. The solution was finally diluted with water to 119 ml. After drying the beads overnight at 135° C., the second impregnation with a solution containing both Pt and Rh, drying at 135° C., and the final catalyst activation were carried out in exactly the same manner as in Example 7. The metals loading of this catalyst is identical to that of the catalyst in Example 7. This catalyst also contains 1.5 wt. % $Li_2O$, 1.5 wt. % NiO, and 2.91 wt. % $CeO_2$.

EXAMPLE 10

An 8.5 cc sample each of the three Pt-Pd-Rh catalysts in Examples 7, 8 and 9 were pulsator-aged for 90 hours in essentially the same manner as in Example 5. The poison levels in the fuel (n-hexane) for this series of aging runs were 0.0528 g/liter Pb, 0.100 g/liter P, and 0.08 wt. % S. The temperature during the aging run was allowed to cycle between 566° C. for 70 minutes and 760° C. for 20 minutes. The aged catalysts were evaluated in the same manner as in Example 5. The performance data are presented in Table 3.

TABLE 3

Performance[a] of Pt-Pd-Rh TWCs After 90-hr. Pulsator Aging

| Catalyst in Example | Promoters (Wt. %) | Rich (R = 0.7) | | | Stoi. (R = 1.0) | | | Lean (R = 1.5) | | |
|---|---|---|---|---|---|---|---|---|---|---|
| | | HC | CO | NO | HC | CO | NO | HC | CO | NO |
| 7 | 6% CeO$_2$ | 67 | 50 | 67 | 67 | 61 | 52 | 66 | 67 | 28 |
| 8 | 6% CeO$_2$ 1% Li$_2$O | 70 | 48 | 67 | 71 | 63 | 59 | 69 | 73 | 31 |
| 9 | 3% CeO$_2$ 1.5% Li$_2$O 1.5% NiO | 73 | 47 | 64 | 74 | 60 | 53 | 74 | 72 | 31 |

[a] At approximately 60,000 GHSV by the "perturbed sweep test".

The data in Table 3 illustrate the presence of a relatively low level of Ni is beneficial especially for HC performance since the values for the catalyst of Example 9 is superior to that of the catalyst in Example 7 having about the same 6% level of base metal additive. This Ni may exist on the catalyst in the form of Ni and NiO. Thus for a catalyst requiring improved HC performance, Example 9 illustrates an optional embodiment which achieves this result.

The following three examples 11, 12, and 13 prepare catalyst according to the present invention in Example 11, to the Kondo et al Japanese patent No. 53-19,986 in Example 12, and to the Toyota Pat. No. 4,369,132 in Example 13. The catalyst are tested in Example 14.

EXAMPLE 11

This catalyst was prepared according to the present invention.

Grace alumina spheres having a nominal size of 3.4 mm average diameter were activated at 399° C. for 16 hours. The resulting spheres had a TV of 6.48% and water pore volume of 1.1 cc/g. 500 grams of these alumina beads were impregnated with a solution prepared by dissolving 52.61 g LiNO$_3$ (100.8% assay) in 250 ml deionized water, combining with 58.35 g Ce(NO$_3$)$_3$ solution (which contains the equivalent of 0.2464 g CeO$_2$ per gram of solution), and then diluting to 500 ml with deionized water. The resulting pH was 5.07. This was then applied to the support at full incipient wetness. The impregnated support was dried for 16 hours at 135° C. followed by activation in air for one hour at 1038° C. The resulting support material had a bulk density of 0.5321 g/cc, a water pore volume of 0.80 cc/g, a TV of 2.70%, and a BET (N$_2$) surface area of 105 m$^2$/g.

Noble metals were applied via the following procedure. 475 grams of the above resulting support were impregnated to 90% of the total water pore volume with a rhodium sulfito complex solution. The rhodium sulfito complex solution was prepared by adding 1.1544 g RhCl$_3$ solution (5.501% Rh) to 20 ml of 60° C. (140° F.) deionized water followed by the addition of 1.57 g of sulfurous acid (7.98% S0$_2$ content) and further diluting to 32 ml total with more 60° C. water. The reaction mixture was contained in a sealed polyethylene bottle, and was submerged for two hours in a water bath maintained at 60° C. After the reaction period the solution was diluted to about 75% of the total water pore volume at which point 0.5048 g of dibasic ammonium citrate was added. The solution was further diluted with deionized water to 342 ml. The rhodium solution was applied by spraying through atomizing nozzles. The impregnated spheres were allowed to stand for two hours in the wet state prior to drying at 135° C. for 16 hours. The rhodium containing spheres were then reimpregnated with a platinum sulfito complex solution prepared by diluting 6.4615 g (NH$_4$)$_6$Pt(SO$_3$)$_4$ solution (9.8369% Pt) with deionized water to 323 ml with deionized water. The platinum solution was applied by spraying through atomizing nozzles. The impregnated spheres were allowed to stand for two hours in the wet state prior to drying at 135° C. for 16 hours. The catalyst was finally activated in a reducing atmosphere (5% hydrogen —95% nitrogen) at 399° C. for one hour. The resultant metal loadings are set forth in Table 4 after Example 13.

EXAMPLE 12

This catalyst was prepared according to the procedure of the Kondo et al Japanese reference with the Ni, La and Sr base metals but with the noble metal loadings of the catalyst in Example 11.

Grace alumina spheres identical to ones described in Example 11 were activated at 954° C. for one hour. Note that this support and all of the other support samples which are described below were prepared using the same base stock of dried only spheres which were manufactured in the Davison Chemical Co. Autocat plant. The resulting properties are a bulk density of 0.4498 g/cc, a water pore volume of 1.0 cc/g, a TV of 1.86%, and a BET (N$_2$) surface area of 144 m$^2$/g Two liters (889.60 grams) of these alumina beads were impregnated to incipient wetness with a solution prepared by dissolving 24.20 g of Sr(NO$_3$)$_2$ at 99.8% assay, 49.98 g of LaCl$_3$.6H$_2$O (at 36.4% H$_2$O assay) in 400 ml deionized water. This solution was then combined with 257.32 g of Ni(NO$_3$)$_2$ solution having a titer of 0.15544 g Ni/g solution. The combined solution was then diluted to 900 ml with deionized water resulting in a pH of 3.35. This solution was applied to the support at full incipient wetness. The impregnated support was dried for 12 hours at 120° C. followed by activation in air for two hours at 600° C. The resulting support material had a bulk density of 0.4976 g/cc, a water pore volume of 0.8 cc/g, a TV of 0.81%, and a BET (N$_2$) surface area of 135 m$^2$/g.

Noble metals were applied via the following procedure. 400 grams of the above resulting support were impregnated to full incipient wetness with a solution prepared by diluting 2.718 g of chloroplatinic acid solution (21.06% Pt), and 1.040 g of rhodium trichloride solution (5.501% Rh) to 320 ml. It was then dried at 120° C. for 12 hours, and then subsequently activated in air at 600° C. for 2 hours. The resultant metal loadings are set forth in Table 4 after Example 13.

EXAMPLE 13

The catalyst was prepared according to the procedure of the Toyota Pat. No. 4,369,132, with the same loadings of Ce, Li and noble metals as the catalyst of Example 11.

Grace alumina spheres identical to one described in Example 11 were activated at 954° C. for one hour. The resulting properties are a bulk density of 0.4498 g/cc, a water pore volume of 1.0 cc/o, a TV of 1.86%; and a BET ($N_2$) surface area of 144 $m^2/g$. 500 g of these alumina beads were impregnated to full incipient wetness with a solution prepared by diluting 61.26 g $Ce(NO_3)_3$ (containing the equivalent of 0.2776 g $CeO_2$ per gram of solution) water. The solution was then diluted to 500 ml with deionized water resulting in a pH of 4.65. This solution was applied to the support at full incipient wetness. The impregnated support was dried for 12 hours at 110° C. followed by activation in air for one hour at 500° C. The resulting support material had a bulk density (as is) of 0.4663 g/cc, a water pore volume of 1.0 cc/g, and a TV of 0.97%.

Noble metals were applied via the following Procedure. 400 grams of the above resulting support were impregnated to full incipient wetness with a solution prepared by diluting 2.900 g of chloroplatinic acid solution (21.06% Pt), and 1.1103 g of rhodium chloride solution (5.501% Rh) to 400 ml. It was then dried at 110° C., and then subsequently activated in air at 500° C. for one hour. At this stage of the preparation the catalyst had a bulk density of 0.4726 g/cc, a water pore volume of 0.97 cc/g, and a TV of 1.015%. The entire quantity less that required for the destructive tests of catalyst (397 g) was sprayed with solution prepared by dissolving 42.73 g $LiNO_3$ (100.8% assay) in deionized water and then diluting to 385 ml. This was followed by drying at 110° C., and subsequent activation in air at 500° C. for one hour. The resultant metal loadings are set forth in Table 4 below.

TABLE 4

| Catalyst of Example No. | Grams of Metal per Liter | | | | | | |
|---|---|---|---|---|---|---|---|
| | Ni | La | Sr | Ce | Li | Pt | Rh |
| 11 | — | — | — | 13.8 | 5.6 | 0.712 | 0.0712 |
| 12 | 20 | 9 | 5 | — | — | 0.712 | 0.0712 |
| 13 | — | — | — | 13.8 | 5.6 | 0.712 | 0.0712 |

EXAMPLE 14

Activity Testing and Aging Data

Fresh and Thermal Tests

Fresh TWC and oxidizing warmup tests were run on each catalyst. The tests are described by M. V. Ernest and G. Kim in Soc. of Automot. Eng. Paper No. 800083 as the "TWC Activity Test" and the "Oxidizing Warmup Test". Comparative TWC sweep tests on the fresh catalysts of Examples 11-13 are shown in Table 5. Fresh oxidizing warmup activities are presented in Table 6.

Each of the catalysts was thermally aged for 24 hours in stagnant air (closed muffle furnace) at 982° C. TWC activity test comparisons on the catalysts of Examples 11-13 are shown in Table 5. The oxidizing warmup performances on the heat treated samples are summarized in Table 6.

Pulsator Aqing

Each of the three catalysts was aged randomly on the pulse flame combustion apparatus. The catalysts were aged under the following conditions:

| Standard Conditions | |
|---|---|
| Aging sample size | 8.5 $cm^3$ |
| Fuel | n-Hexane |
| Fuel poison levels | 0.10 g P per gallon |
| | 0.05 g Pb per gallon |
| | 0.025 g Zn per gallon |
| | 0.08 weight % Sulfur |
| Fuel flow rate | 15 ml. per hour |
| Temperature cycle | 30 minutes at 1600° F. |
| | 60 minutes at 1000° F. |
| Air/fuel ratio | Lean |
| | (viz., R > 1) |

Aging time between tests 67.5 hours

Aging was carried out for a total of 202.5 hours (three 3-day cycles). Table 5 is a comparison showing the performances fresh and at each of the three aging cycles. TWC and oxidizing warmup tests were run after each 3-day cycle. The oxidizing warmup activities after the various aging cycles are summarized in Table 6.

TABLE 5

Performance of Pt-Rh Catalysts in Cycled TWC Test Before and After Pulsator Aging

| Catalyst in Ex. No. | Time (HR) | Conversions at CO/NO Crossover | |
|---|---|---|---|
| | | CO & NO | HC |
| 11 | 0.0 | 92 | 88 |
| | 67.5 | 78 | 61 |
| | 135.0 | 86 | 71 |
| | 202.5 | 76 | 60 |
| 12 | 0.0 | 83 | 75 |
| | 67.5 | 72 | 53 |
| | 135.0 | 69 | 52 |
| | 202.5 | 61 | 46 |
| 13 | 0.0 | 82 | 71 |
| | 67.5 | 87 | 74 |
| | 135.0 | 84 | 70 |
| | 202.5 | 70 | 53 |

TABLE 6

OXIDIZING WARMUP ACTIVITIES

| ACTIVITY PARAMETER | Catalyst of Example | | |
|---|---|---|---|
| | 11 (ours) | 12 (Kondo et al) | 13 (Toyota) |
| | FRESH | | |
| delta t, sec. | 24 (23)* | 44 (73) | 91 (110) |
| $t_{50}$CO Conv., sec. | 56 (61) | 76 (135) | 99 (143) |
| $t_{50}$HC Conv., sec. | 99 (122) | — (—) | — (—) |
| $C_3H_8$ Conv., % | 75 | 42 | 36 |
| CO Conv., % | 99 | 98 | 98 |
| | AFTER 24 HOURS AT 1800° F. | | |
| delta t, sec. | 52 | — | 356 |
| $t_{50}$CO Conv., sec. | 303 | — | 455 |
| $t_{50}$HC Conv., sec. | — | — | — |
| $C_3H_8$ Conv., % | 41 | — | 28 |
| CO Conv., % | 97 | 4 | 97 |
| | AFTER ONE CYCLE (67.5 HOURS) PULSATOR AGING | | |
| delta t, sec. | 39 | 50 | 31 |
| $t_{50}$CO Conv., sec. | 106 | 106 | 84 |
| $C_3H_8$ Conv., % | 41 | 23 | 45 |
| CO Conv., % | 98 | 97 | 99 |
| | AFTER TWO CYCLES (135 HOURS) PULSATOR AGING | | |
| delta t, sec. | 46 | 62 | 47 |
| $t_{50}$CO Conv., sec. | 95 | 115 | 93 |
| $C_3H_8$ Conv., % | 37 | 17 | 41 |
| CO Conv., % | 97 | 97 | 98 |
| | AFTER THREE CYCLES (202.5 HOURS) PULSATOR AGING | | |
| delta t, sec. | 55 | 138 | 54 |
| $t_{50}$CO Conv., sec. | 110 | 124 | 119 |
| $C_3H_8$ Conv., % | 31 | 15 | 34 |

TABLE 6-continued

OXIDIZING WARMUP ACTIVITIES

| ACTIVITY PARAMETER | Catalyst of Example | | |
|---|---|---|---|
| | 11 (ours) | 12 (Kondo et al) | 13 (Toyota) |
| CO Conv., % | 97 | 95 | 97 |

*Numbers in ( ) are initial lightoff values.

Results and Conclusions

A. TWC Performance Data in Cycled TWC Test from Table 5

All of the catalysts were evaluated for Carbon Monoxide (CO) and Hydrocarbon (HC) conversion at the CO/NO crossover point. This point is a significant point at which to evaluate an auto exhaust catalyst since it is here where the highest simultaneous CO and NO conversions are obtained. Our catalyst had the best results.

B. Oxidizing Warmup Performance Data from Table 6

Fresh Catalyst

For the fresh catalysts, our catalyst in Expt. 11 is significantly better than the Kondo et al catalyst in Expt. 12 or the Toyota catalyst in Expt. 13.

Thermally Aged Catalyst

After the catalysts were given the 24 hour thermal treatment at 1800° F, our catalyst had better results than the other two catalysts.

EXAMPLE 15

In this example the noble metal distributions were determined for the catalysts of Examples 11-13 via our layer abrasion procedure.

Approximately 100 grams each of the catalysts of Examples 11-13 were shaken in ethanol. The surface layers are slowly abraided away with the resulting powder quantitatively collected and subsequently analyzed by PIXE (Proton Induced X-Ray Emission). An oblate spheroid model (uniform density and uniform abrasion rate are fundamental assumptions of the model) is then used to estimate the depths corresponding to the abraided surface layers. This then allows direct comparison of noble metals (or any other compositional component) concentrations as a function of depth. The Pt concentrations of Catalysts 11-13 are summarized in Table 7.

TABLE 7

| Depth Range (microns) | Platinum Distribution (%) | | |
|---|---|---|---|
| | Ex. 11 (ours) | Ex. 12 (Kondo) | Ex. 13 (Toyota) |
| 0-25 | 11 | 6 | 13 |
| 25-50 | 8 | 6 | 10 |
| 50-75 | 13 | 5 | 8 |
| 75-100 | 11 | 4 | 6 |
| 100-125 | 10 | 4 | 4 |
| 125-150 | 9 | 5 | 6 |
| 150-175 | 6 | 3 | 4 |
| 175-200 | 5 | 4 | 5 |
| 200-250 | 9 | 6 | 6 |
| 250-300 | 5 | 6 | 6 |
| Cumulative Total | 87 | 49 | 70 |

The data shows the clear difference in Pt distribution. Our catalyst does not have the monotonically decreasing platinum distributions as do Kondo et al and Toyota. The Kondo et al and Toyota catalysts clearly have a smaller portion of the platinum in the region from the exterior catalyst surface down to about 300 microns. The Toyota catalyst has a higher surface concentration of platinum, but our catalyst has the higher subsurface (in the region of about 50 to about 100) concentration. The Kondo et al catalyst has the lowest surface concentration of platinum and the lowest percentage of platinum at the surface. Only the sample prepared by our procedure exhibits a noticeable deviation from the monotonically decreasing Pt concentrations in the subsurface regions of the Kondo et al and Toyota type catalysts.

A similar comparison for rhodium distributions shows the cumulative distributions to be very similar.

It is understood that the foregoing detailed description is given merely by way of illustration and that many variations may be made therein without departing from the spirit of this invention.

What is claimed is:

1. A catalyst suitable for use as a three-way catalyst for auto emission control comprising an alumina pelleted support having deposited thereon 1-20% by weight of ceria as a promoter, at least 0.5 to about 5% by weight of an alkali metal oxide as a promoter, and a catalytially-effective amount of one or more platinum group metals comprising at least platinum and rhodium, said platinum group metals penetrating the alumina support to an average distance less than approximately 300 microns as measured by the $SnCl_2$ solution staining method, said platinum having a platinum concentration curve as function of depth which is concave down, i.e., having a second derivative of the mathematical expression describing the concave-down segment of the curve which is not greater than zero, from the surface down to a point of inflection for the curve.

2. A catalyst according to claim 1, wherein the alkali metal oxide is $Li_2O$.

3. A catalyst according to claim 1, wherein the ceria is present from about 2 to 10 wt. % $CeO_2$ and the alkali metal oxide is present from 0.5 to 4 wt. % alkali metal oxide.

4. A catalyst according to claim 1, wherein said rhodium has a maximum rhodium concentration within about 50 microns of the exterior surface of the support but not more than about 80% of the total rhodium loaded being located within about 100 microns depth.

5. A catalyst according to claim 1, wherein nickel is further added in an amount of 0.5 to 20 wt. %

6. A catalyst according to claim 4, wherein the nickel is added in an amount of 1-10% NiO.

7. A method of making a catalyst which is suitable for use as a three-way catalyst for auto emission comprising the steps of (a) applying promoters and at least two platinum group metals by either

A (1) impregnating an alumina pelleted support which has been heated to at least 300° C. with a soluble cerium salt solution;

(2) heating the impregnated support to at least decompose the cerium salt to obtain a ceria impregnated support; and (3) impregnating the ceria impregnated support with solutions bearing two or more platinum group metals, which include at least platinum and rhodium, and at least one alkali metal and wherein at least part of the Rh in the form of a Rh containing solution is impregnated separately from the other platinum group metal solutions and alkali metal-bearing solutions; or B
(1) impregnating an alumina support which has been heated to at least 300° C. with a solution containing a cerium salt and a lithium salt;
(2) heating the impregnated support to at least decompose the cerium and lithium salts to obtain a ceria-lithia impregnated support; and
(3) impregnating the ceria-lithia impregnated support with solutions bearing two or more platinum group metals, which include at least platinum and rhodium, and where the Rh containing solution has at least part of the Rh solution impregnated separately from the other platinum group metal solutions to form a catalyst;

(b) air drying the catalyst at ambient temperature for 0-4 hours, and at about 100°-150° C. to dry the catalyst after each impregnation with solutions bearing catalytic metals; and (c) activating the catalyst, which has previously been heated to a temperature of at least 800°-1100° C. in step (a), at a temperature of about 250°-550° C.

8. A method according to claim 7, wherein the activation in step (c) is done in the presence of hydrogen.

9. A method according to Claim 7, wherein the platinum group metals in step (aA3) or (aB3) are provided in the form of water soluble platinum group metal compounds which are selected from the group consisting of sulfito complexes of platinum group metals, chloroplatinic acid, potassium platinum chloride, ammonium platinum thiocyanate, ammonium platinum thiosulfate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

10. A method according to claim 9, wherein the platinum group metals in step (aA3) or (aB3) are provided in the form of sulfito complexes.

11. A method according to claim 7, wherein the Rh containing solution further contains a penetration aid.

12. A method according to claim 7, wherein the alkali metal in step (aA3) is lithium.

13. A method according to claim 7, wherein nickel is further added in an amount of 0.5-20% NiO.

14. A method according to claim 13, wherein the nickel is added in an amount of 1-10% NiO.

15. A method according to claim 7, wherein the solutions of cerium salt and lithium salt are applied in step (aB1) either (a) by first a cerium salt followed by a lithium salt, (b) by first a lithium salt followed by cerium salt or (c) by a simultaneous application of a mixture of the cerium salt and the lithium salt.

16. A catalyst made by the process of claim 7.

17. A catalyst made by the process of claim 10.

* * * * *